United States Patent [19]

Danuser et al.

[11] Patent Number: 5,204,956
[45] Date of Patent: Apr. 20, 1993

[54] METHOD AND APPARATUS FOR MONITORING THE EXECUTION TIME OF A COMPUTER PROGRAM

[75] Inventors: Andreas Danuser, Gebenstorf; Lothar Krings, Baden, both of Switzerland

[73] Assignee: Asea Brown Boveri Ltd., Baden, Switzerland

[21] Appl. No.: 431,784

[22] Filed: Nov. 6, 1989

[30] Foreign Application Priority Data

Nov. 9, 1988 [CH] Switzerland .................. 4161/88

[51] Int. Cl.⁵ ........................................ G06F 11/34
[52] U.S. Cl. ......................... 395/575; 364/DIG. 1; 364/267; 364/267.4; 364/261.2; 371/19
[58] Field of Search ............... 364/200, 900, 551.01; 371/19; 395/575

[56] References Cited

U.S. PATENT DOCUMENTS

| | | | |
|---|---|---|---|
| 3,707,725 | 12/1972 | Dellheim | 364/200 |
| 4,205,370 | 5/1980 | Hirtle | 364/200 |
| 4,231,106 | 10/1980 | Heap et al. | 364/900 |
| 4,367,525 | 1/1983 | Brown et al. | 364/200 |
| 4,435,759 | 3/1984 | Baum et al. | 364/200 |
| 4,462,077 | 7/1984 | York | 364/200 |
| 4,497,022 | 1/1985 | Cormier et al. | 364/200 |
| 4,598,364 | 7/1986 | Gum et al. | 364/200 |
| 4,683,532 | 7/1987 | Yount et al. | 364/200 |
| 4,802,165 | 1/1989 | Ream | 371/19 |
| 4,819,233 | 4/1989 | Delucia et al. | 371/19 |
| 4,821,178 | 4/1989 | Levin et al. | 364/200 |
| 4,866,665 | 9/1989 | Haswell-Smith | 395/575 |
| 4,899,306 | 2/1990 | Greer | 364/900 |
| 4,905,171 | 2/1990 | Kiel et al. | 364/551.01 |
| 4,910,663 | 3/1990 | Bailey | 395/575 |
| 4,920,538 | 4/1990 | Chan et al. | 371/19 |
| 5,010,477 | 4/1991 | Omoda et al. | 395/800 |
| 5,022,028 | 6/1991 | Edmonds et al. | 371/25.1 |
| 5,050,168 | 9/1991 | Paterson | 371/19 |
| 5,067,073 | 11/1991 | Andrews | 395/375 |

OTHER PUBLICATIONS

Harward; "IBM Tech Disclosure Bulletin 'PI/1 Trace Program'" vol. 13 No. 4 Sep. 1970.
IBM Tech Disclosure Bulletin; "Recording trace data in restrictive Environments" vol. 30, No. 10 Mar. 1988.
IBM Tech Disclosure Bulletin; "Special Instruction to initiate and supplement program trace junctions" vol. 12 No. 6 Nov. 1969.
Sartzetakis et al., "A real-time Multiprocessor Performance Monitoring Tool", IEEE Electronic, vol. 1 pp. 104–108.
Callaway; "General Purpose Data Collection Method"; IBM Technical Disclosure Bulletin; vol. 16, No. 6; Nov. 1973; pp. 1796–1798.
IBM Technical Disclosure Bulletin, vol. 30, No. 6, Nov. 1987 (Armonk, N.Y., US) "Performance Trace Facility", pp. 296–297.
IBM Technical Disclsoure Bulletin, vol. 26, No. 11, Apr. 1984 (Armonk, N.Y., US) "Instruction Stream Trace", pp. 6217–6220.
Electronic Design, vol. 33, No. 22, Sep. 1985 (Hasbrouck Heights, N.J., US) B. Ableidinger et al., "Real-time Analyzer Furnishes High-level Look at Software Operations", pp. 117–131.

*Primary Examiner*—Thomas C. Lee
*Assistant Examiner*—Krisna Lim
*Attorney, Agent, or Firm*—Burns, Doane, Swecker & Mathis

[57] ABSTRACT

A method and apparatus are provided for observing the progress in time of an object program executed by a computer system. Information items relating to the flow of the object program are detected by an observation tool at an interface of the computer system being evaluated. Unambiguously identifiable observation points in the form of output commands are inserted at specifically selected points in a source program allocated to the object program. The observation points are stored in a table in a database in the observation tool. When the source program is executed, identification signals associated with the observation points are sent to the observation tool by the computer system. The observation tool calculates object program events which specify object program execution times for each object computer of the computer system. The calculated events are evaluated in the observation tool in the program language of the source program with reference to the observation points stored in table form.

14 Claims, 3 Drawing Sheets

METHOD AND APPARATUS FOR MONITORING THE EXECUTION TIME OF A COMPUTER PROGRAM

BACKGROUND OF THE INVENTION

The present invention relates to an apparatus and a method for observing the progress in time of an object program executed by a computer system.

Such a method is of great significance for assessing the performance, for example recognizing and eliminating bottlenecks or for optimally dimensioning computer systems and for analyzing programming errors of the programs executed in the computer systems. In this connection, however, the progress in time of the programs must not be affected by the observation. The programs running are subjected to hard boundary conditions with respect to time, particularly in process control engineering, so that in this case the observation of the program run should, in practice, occur under real-time conditions. This is particularly problematic in multi-processor systems and computer networks Methods of the type initially mentioned are known, for example, from Informatik-Spektrum (1985) 8, pages 37-40. In comparatively simple computers, the progress in time of an object program running on this computer can be directly and completely traced by applying a measuring probe of an electronic measuring instrument to hardware test points, such as address, data or control lines of an object computer This is no longer possible in complex computers since the information needed for executing the program is no longer conducted directly via lines into the central arithmetic and logic unit. In such computers, additional software is generally used for observing the program run, which runs alternately with the object program executed in the computer system. However, this delays the progress in time of the object program.

SUMMARY OF THE INVENTION

Accordingly, the present invention achieves the object of specifying a method and an observation tool which enable the progress of an object program to be observed almost under real-time conditions even in the case of complex computer systems. The method and the observation tool according to the invention are characterized by the fact that it is possible to observe the program run virtually under real-time conditions without knowledge of computer-internal sequences and without intervention in the hardware of a complex computer system. This is due to the fact that the execution of an output command required for this purpose is of the order of magnitude of microseconds, whereas the real-time requirements set for the complex computer system are usually of the order of milliseconds. Heterogeneous, loosely- or closely-coupled multi-computer systems can be analyzed without problems. In addition, each object computer is observed at the level of the language of the source program in this case, so that the programming error which may occur can be rapidly found.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
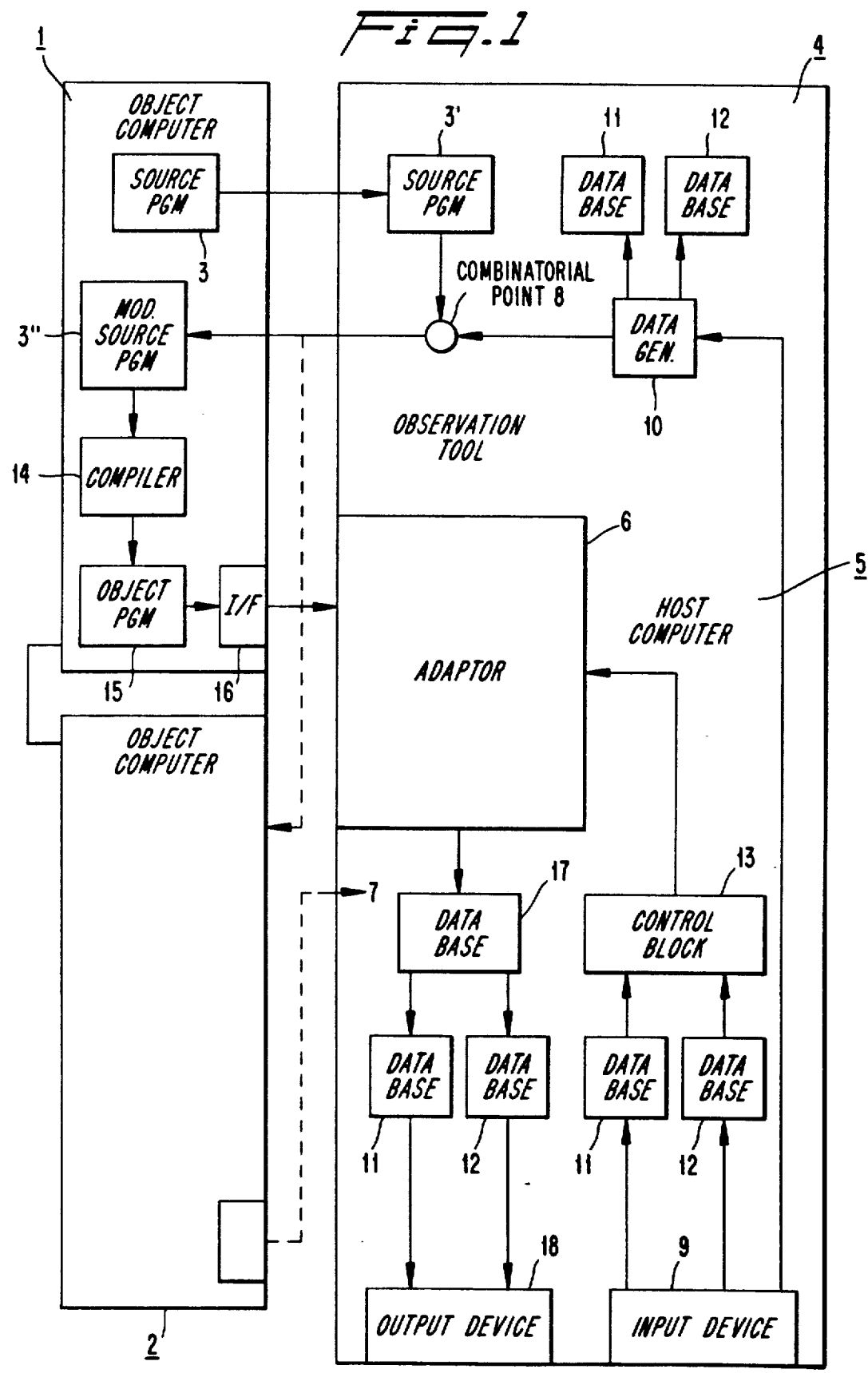
FIG. 1 shows a block diagram of a computer system with two object computers running in parallel and an observation tool according to the invention, which contains one adaptor each for each object computer.

Referring now to the drawings, wherein like reference numerals designate identical or corresponding parts throughout the several views, in FIG. 1 two object computers 1, 2 of a computer system are shown which communicate with one another. The two object computers 1, 2 can be of identical or different construction. The communication can be close or loose. Instead of two computers, the system can also contain three or more computers. A source program 3, which can be copied into an observation tool 4 as copy 3' on request is loaded into the object computer 1. The observation tool 4 contains a host computer 5 transmitting the request and adaptor 6 or 7, respectively, which are in each case allocated to one of the two computers 1 or 2, respectively, and of which the adaptor 7 only is indicated. The copy 3' of the source program 3 deposited in the observation tool 4 is modified at a combinatorial point 8 by unambiguously marked observation points in the form of output commands being inserted at selected and unambiguously located points in the source program. Such observation points can be automatically inserted into the source program via a data generator 10 activated by an input device 9 of the host computer 5.

The observation points supplied by the data generator 10 are at the same time stored in table form in databases 11, 12 of the observation tool 4. In database 11, data are stored which enable an observation point to be unambiguously associated with a particular point of the source program. In database 12, data are stored which enable an observation point, extended by additional data of the source program such as variable values with corresponding variable type and name, to be unambiguously associated with a particular point of the source program. To provide the possibility of effective operation with a restricted number of data, observation points of interest are selected from the databases 11 and 12 before an observation of the program run on the computer system, and are entered in table form, by means of a control block 13, into two databases of which one each is located in the adaptor 6 and in the adaptor 7.

The modified source program 3" formed at the combinatorial point 8 is copied into the object computer 1 and 2 and is converted in a compiler and linker 14 (only indicated at the computer 1) into an object program 15 (only indicated at the computer 1) which is subsequently executed by the object computers.

During the run of the object program 15, an unambiguous identification in the language of the object computer 1 is in each case output for each observation point at an interface 16 of the object computer 1 by execution of the commands associated with the inserted observation points. This identification is transferred to the adaptor 6 of the observation tool 4. In the adaptor 6, it is determined, by comparison with the selected observation points stored in its database, whether the identification present is of interest for the observation being performed. If this is the case, the identification detected as being of interest is marked in time, enabling the output in object computer 1 to be identified, and is subsequently stored as event in a database 17 of the host computer 5.

The events stored in the database 17 can be evaluated off-line and represented in the form of tables or histograms in an output device 18 of the host computer 5. In this connection, the observation points stored in databases 11 and 12 establish the reference between the object program running in machine language and to be observed and the source program 3 written in the higher-level language familiar to the user.

Figure 2:
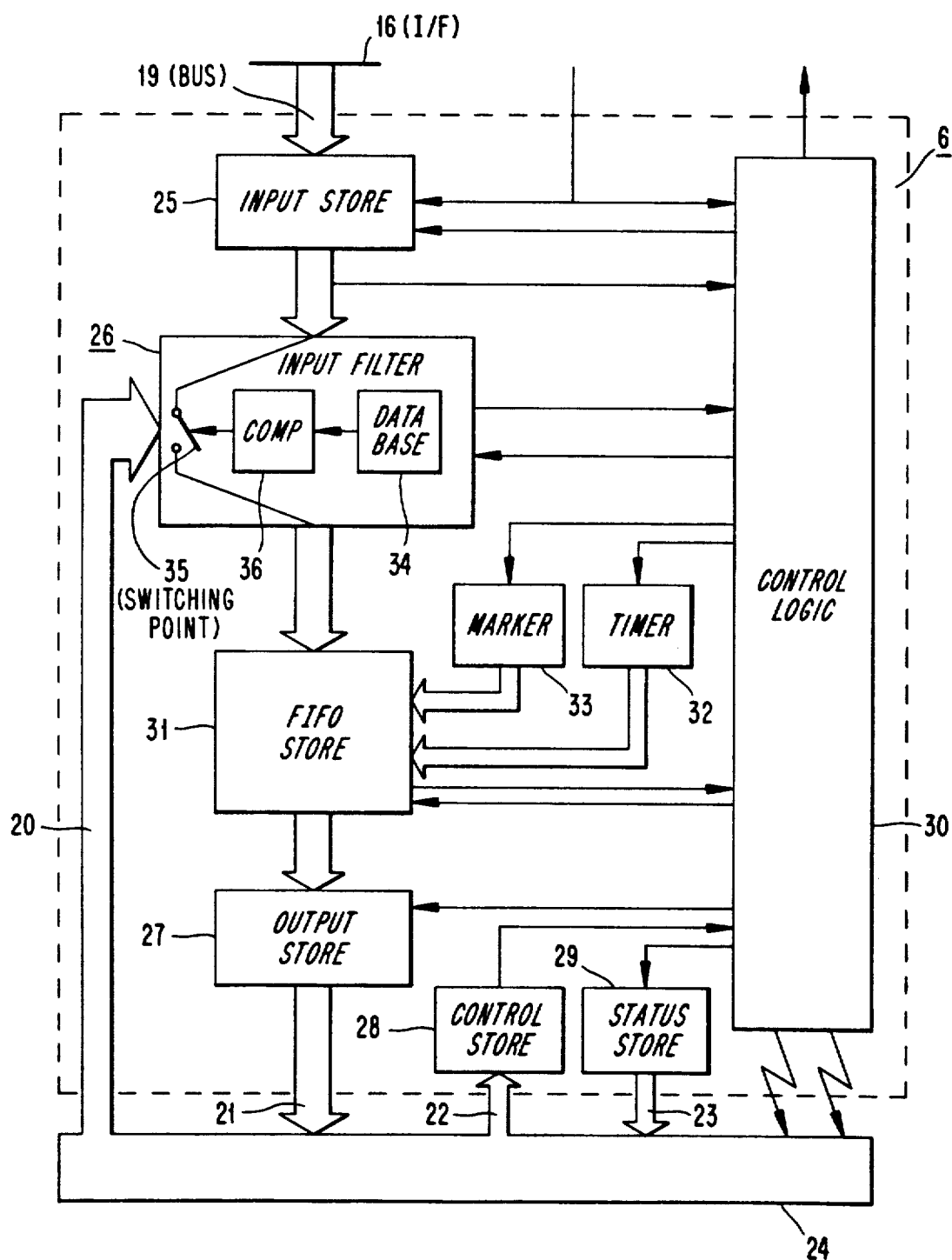
FIG. 2 shows a block diagram of one of the two adaptors of the observation tool according to FIG. 1.

In FIG. 2, the adaptor 6, intended for selecting the identifications output by the object computer 1 and for forming the events is shown in the form of a block diagram. The adaptor 6 is connected via a bus 19, which is preferably intended for transmitting 16-bit data words, to the interface 16 of the object computer 1 and via further buses 20, 21, 22 and 23 to a bus 24 of the host computer 5. The bus 19 is connected to an input store 25 of the adaptor, whilst the buses 20, 21, 22, 23 successively secure effective connections between an input filter 26 containing the database for the observation points of interest during the observation, an output store 27, a control store 28, a status store 29 and the host computer. A control logic 30, preferably built up with programmable solid-state chips, is connected via control lines, not designated, both to the object computer 1 and to the input store 25, the input filter 26, a FIFO store 31, a timer 32, a marker 33, the output store 27, the control store 28 and the status store 29. The input store 25 acts on the FIFO store 31 via the input filter 26. An output of the FIFO store 31 is connected to an input of the output store 27. The outputs of the timer 32 and of the marker 33 are connected to inputs of the FIFO store 31. In addition to the database 34 which stores the observation points of interest which are copied via the buses 24 and 20, the input filter 26 also contains a comparator 36 which operates a switching point 35 between filter input and filter output.

If a program identification (PID) is present at the interface 16 during execution of the object program 15 to be observed, this is signalled to the control logic 30. The control logic 30 then causes the program identification to be copied into the input store 25 acting as buffer. The identifications copied exhibit the data format or structure specified in the left-hand section of FIG. 3. The identifications, designated, PID (Program Identification) have been copied successively from bottom to top into the input store 25. Preferably the first one of 16 bits, in each case allocated to each PID identification, contains the information on the type of identification. If this is an identification which exclusively locates a position of the program observed, the value of the bit is in each case 0. If, in contrast, the identification is supplemented by additional program information items such as variable words 1, 2, . . ., N, the value of the bit is clearly 1. The structure of the identifications sent by the object computer 1 enables the control logic to detect whether the identification only consists of one 16-bit data word or whether further data words belonging to the identification will still be sent by the object computer. In accordance with this data structure, the control logic 30 will therefore cause the identifications to be stored in the input store 25 in accordance with the left-hand half of FIG. 3.

The identifications stored in the input store 25 are successively conducted to the input filter 26 by the control logic 30. By comparing each of the identifications supplied with the identifications stored in the database 34 in the comparator 36, it is established whether the identification supplied is of interest for the observation carried out. If this is the case, the switching point 35 is closed and the identification present is copied into the first-in-first-out (FIFO) store 31. At the same time, the control logic 30 causes the current time supplied by the timer 32 and an identification of the associated object computer 1, supplied by the marker 33, to be copied into the FIFO store, as a result of which an event associated with the identification is stored in the FIFO store. If the identification also entails additional information items such as, for example, values of variables, these values of variables are also copied into the FIFO store 31 for forming the event. This can be effected by the fact that the bit determining the type of identification and exhibiting a value of one activates a word counter which instructs the control logic to allow the words counted by it also to pass into the FIFO store 31 by appropriately switching the input filter 26.

Figure 3:
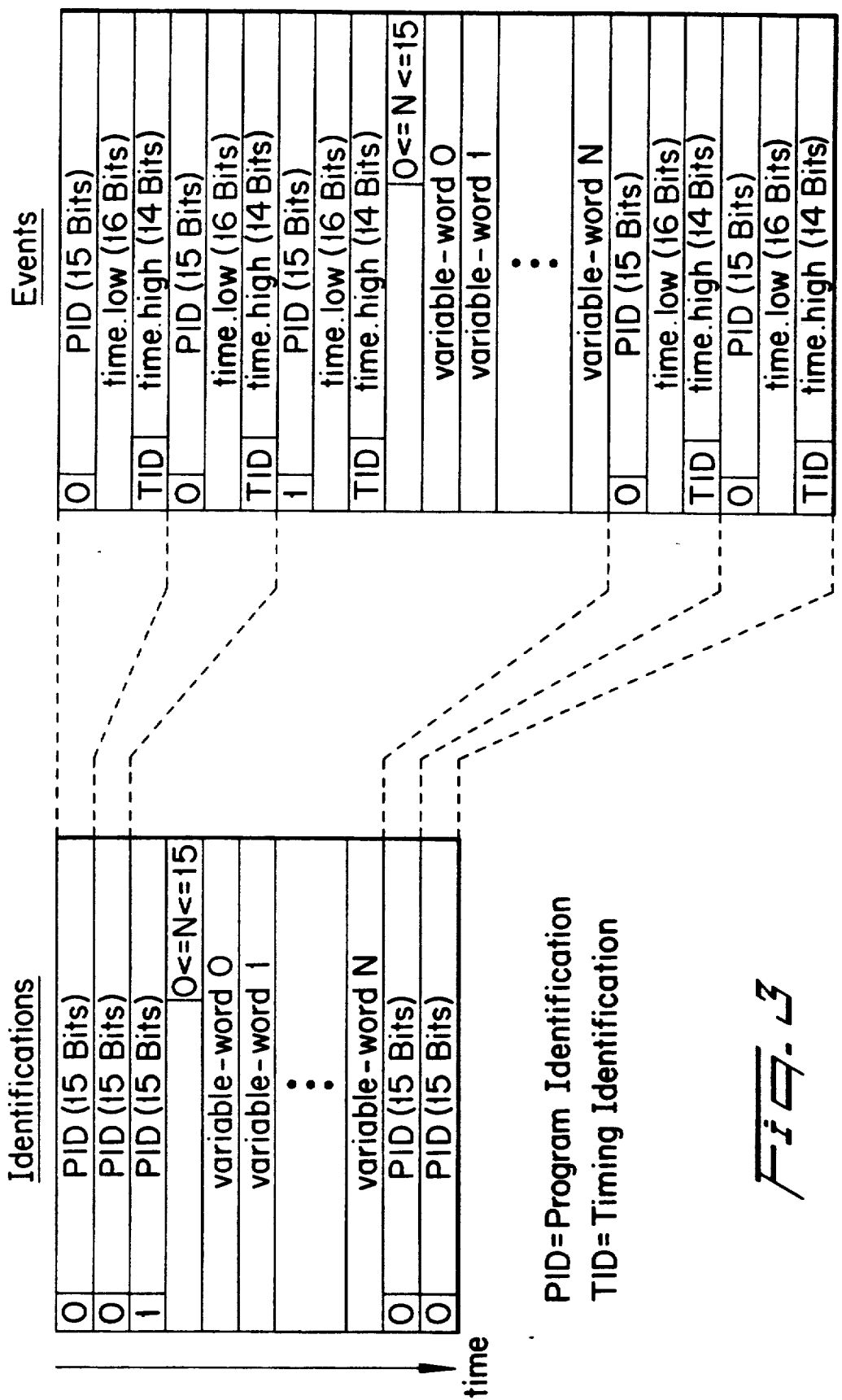
FIG. 3 shows the data structures of an identification output by one of the two object computers according to FIG. 1 at one interface and accepted by the adaptor according to FIG. 2, and of an event formed in the adaptor and allocated to the identification.

The events stored in the FIFO store 31 exhibit the data structure specified in the right-hand half of FIG. 3. In this connection, time low, time high designate the time information and Timing Identification (TID), a marking enabling the associated object computer to be identified and supplied by the marker 33.

The host computer 5 is coupled via the status store 29 accommodating the status signals of the adaptor 6 and the control store 28 receiving control signals from the host computer 5 to the adaptor 6. It can therefore chronologically call up the events stored in the FIFO store 31 via the output store 27 acting as buffer and copy these events into its database, provided for final storage, for concluding evaluation.

The adaptor 7 provided for the object computer 2 is constructed correspondingly to adaptor 6. Its timer is generally synchronized with the timer 32 of the adaptor 6. It is also possible to provide instead of two timers only one timer which is common to the two adaptors 6, 7. Naturally, more than two adaptors can also be built into the observation tool 4, depending on the number of object computers communicating with one another in the computer system. The important factor in this connection is, however, that all these adaptors run synchronously in time, so that, when forming the events, a uniform time base exists for an exact observation of the program running.

Thus, the method according to the invention enables the progress in time of a program executed in a computer system with one or several object computers to be monitored under real-time conditions. In this arrangement, performance measurements having differently constructed object computers of the system monitored can be carried out without any problems, and statements made on the capacity utilization of the entire computer system, via the events related to the source program. Flow analyses determined from the events, on the other hand, can rapidly solve the problem of how the object computers of the computer system. monitored interact so that a poor capacity utilization of a multi-computer system can be detected and eliminated without effort.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the U.S. is:

1. A computer-implemented method for controlling an observation tool having a host computer to observe program instruction execution times of an existing object program executed by a computer system, comprising the computer implemented steps of:
   inserting by said host computer unambiguously recognizable observation points in the form of output commands at unambiguously located program points in a source program to create a modified source program which is then translated into the object program by said computer system;
   storing each of said observation points and unambiguously associated program point in the observation tool;
   receiving by said observation tool via an interface connected between said observation tool and said computer system, when said object program is being executed by said computer system, an unambiguous identification signal of each of the observation points during execution of the output commands associated with the observation points; and
   storing in said observation tool a an event, at least some of the output identification signals received from said interface along with an associated transfer time representing execution time of the stored event.

2. A method as claimed in claim 1, wherein some of the observation points are output with additional information including the value and the type of at least one variable, by means of the output commands in addition to the identification of the observation point and are stored in table form in the observation tool.

3. A method as claimed claim 1, wherein, before program execution of the object program, some of the observation points stored in the observation tool are stored in a database having rapid access during the execution of the observation for selection of the identification signals transferred to the observation tool.

4. A method as claimed in claim 1, further comprising: a computer system having at least two object computers which run in parallel, with each object computer having at least one interface for outputting the identification signals associated with the observation points, wherein the identification signals are detected in the observation tool using a common time base, and wherein an additional identification signal for identifying a particular object computer is added to the identification signal output by that particular object computer.

5. A method for determining a time of execution of high level language program instructions, comprising the computer implemented steps of:
   automatically modifying in a host computer a high level language program received from one of a plurality of object computers by inserting an identification instruction adjacent to at least one specific high level language program instruction of said high level language program whose execution time is to be monitored;
   automatically translating in one of said object computers said modified high level language program into a lower level language program;
   executing said lower level language program in said one object computer and outputting execution information to the host computer;
   monitoring in said host computer the execution of said lower level language program said step of monitoring further including:
      identifying execution of each identification instruction, and
      storing in a memory a corresponding program execution time along with each identified identification instruction for subsequent evaluation.

6. The method according to claim 5, wherein said identification instructions in said step of automatically modifying include additional information including a value and a type of at least one variable.

7. The method according to claim 5, further comprising:
   storing said identification instructions in a data base in said host computer before said modifying step.

8. An observation system for determining a time of execution of high level language source program instructions, comprising:
   plural, parallel object computers each having:
      means for receiving and storing a source program and a modified source program,
      means for translating said modified source program into a lower level language object program, and
      means for executing said lower level language object program and outputting execution information to a host computer; and
   said host computer being interfaced with at least one of said object computers and including:
      means for receiving a source program from at least one of said object computers;
      means for generating said modified source program from said received source program, said generating means further including:
         means for selecting instructions whose execution time is to be monitored in said source program,
         means for inserting an identification instruction adjacent to at least one of said selected instructions, and
         means for transferring said modified source program to said storing means; and
      means for monitoring execution of said lower level language object program including:
         means for identifying an execution of each identification instruction, and
         means for registering a corresponding program execution time along with each identified identification instruction for subsequent evaluation.

9. The system according to claim 8, wherein each of said identification instructions includes information identifying one of said object computers.

10. The system according to claim 8, wherein said monitoring means further comprises:
    adaptor means, connected to an interface of one of said object computers, for receiving an identification command signal upon execution of a selected instruction.

11. The system according to claim 10, wherein said adaptor means includes:
    control logic means for interfacing communications with said host computer;

a first-in-first-out (FIFO) memory, addressable by said host computer and connected to said interface and said control logic means, for successively storing said identified instructions and their corresponding execution times.

12. The system according to claim 11, wherein said adaptor means further includes:

filtering means, connected between said interface and said FIFO memory, for passing only selected executed identification to said FIFO memory.

13. The system according to claim 12, wherein said filtering means includes:

a database means for storing identification command signals, and a comparator means for comparing said identification command signals from said database with identification command signals from said interface.

14. The system according to claim 10, wherein said adaptor means includes an adaptor for each object computer, each adaptor being controlled using a common, synchronized timer.

* * * * *